Figure 3:
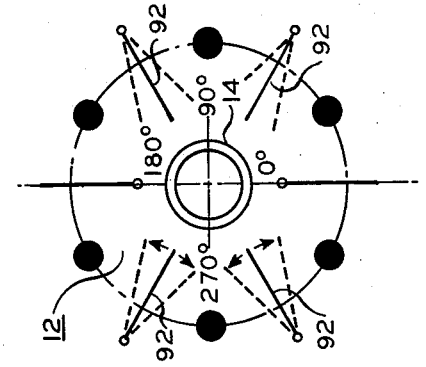

United States Patent [19]

Seefluth

[11] 3,950,459

[45] Apr. 13, 1976

[54] CONTINUOUS PROCESS FOR PRODUCING, REHEATING, AND BLOW MOLDING PARISONS

[75] Inventor: Charles L. Seefluth, Bartlesville, Okla.

[73] Assignee: Phillips Petroleum Company, Bartlesville, Okla.

[22] Filed: Feb. 11, 1975

[21] Appl. No.: 549,107

Related U.S. Application Data

[63] Continuation of Ser. No. 318,704, Dec. 27, 1972, abandoned.

[52] U.S. Cl. .................. 264/25; 219/354; 219/388; 264/40; 264/99; 264/327; 425/DIG. 208; 425/DIG. 231; 432/11
[51] Int. Cl.² ......................................... B29C 17/07
[58] Field of Search ............. 264/25, 40, 94, 96, 97, 264/98, 99, 89, 90, 92, 327; 425/326 B, 387 B, DIG. 208, 231; 219/354, 388; 432/11, 226, 330, 331

[56] References Cited
UNITED STATES PATENTS

| | | | |
|---|---|---|---|
| 3,294,883 | 12/1966 | Polka | 264/327 X |
| 3,368,241 | 2/1968 | Williams | 425/465 X |
| 3,591,767 | 7/1971 | Mudie | 219/354 |
| 3,715,109 | 2/1973 | Gilbert | 219/388 X |
| 3,775,524 | 11/1973 | Seefluth | 264/97 |

FOREIGN PATENTS OR APPLICATIONS 1,816,489   8/1970   Germany ............................. 264/94

OTHER PUBLICATIONS

R. E. Schanzle & C. W. Hurst, "Rapid, Easily Programmed Parison Control," *MODERN PLASTICS*, Jan. 1969, pp. 137 and 138.

*Primary Examiner*—Jan H. Silbaugh

[57] ABSTRACT

The process comprises heating a hollow thermoplastic parison to orientation temperature ranges by selectively applying radiant heat to at least three portions of the parison. The thus irradiated parison is passed to a molding zone, and therein subjected to a pressure differential sufficient to expand the parison into conformity with a molding zone cavity.

7 Claims, 4 Drawing Figures

U.S. Patent  April 13, 1976  3,950,459

CONTINUOUS PROCESS FOR PRODUCING, REHEATING, AND BLOW MOLDING PARISONS

This is a continuation application of my copending application having Ser. No. 318,704, filed Dec. 27, 1972, now abandoned.

This invention relates to an improved parison blow molding process employing the selective irradiation of a hollow thermoplastic parison.

Hollow articles, such as bottles, can be produced at orientation temperatures having remarkable resistance to impact by processes known to the art such as those described by Wiley, U.S. Pat. No. 3,288,317, U.S. Pat. No. Re. 26,956 and Turner et al., U.S. Pat. No. 3,390,426. Heretofore, however, the prior art has not provided a process for imparting to portions of a hollow thermoplastic parison orientation temperature ranges that permit a wide variety of blow molded article shapes to be formed having substantially uniform wall thicknesses.

It is an object of this invention to provide a process for the preparation of hollow thermoplastic blow molded articles having substantially uniform wall thicknesses. Another object is to provide a process for the preparation of hollow thermoplastic blow molded articles that selectively applies radiant heat to at least three radial portions of a hollow thermoplastic parison. Other objects will be readily apparent from the written description, the drawing and the appended claims.

In accordance with the practice of this invention, an improved parison blow molding process is provided which comprises heating a hollow thermoplastic parison to orientation temperature ranges by selectively irradiating at least three portions of the parison, passing the thus irradiated parison into a molding zone, and thereafter creating a pressure differential sufficient to expand the parison out into conformity with a molding zone cavity.

In general and broadly, this invention can be described as a process of selectively channeling radiant heat to at least three portions of a parison in order to provide the parison with at least three orientation temperatures, passing the thus-selectively irradiated parison into a molding zone, and subsequently molding said parison into a hollow article of manufacture whereby the thickness of all wall sections of the resulting molded article are substantially uniform.

In general, the techniques described by Wiley and Turner, involving forming a parison, cooling it well below its melting point, and thereafter reheating it to orientation temperature, which is just below the crystalline melt point in the case of crystalline material and 40°–225° F below the homogeneous melt point for amorphous materials are employed in the practice of this invention. Preferably wherein the thermoplastic polymer employed is a homopolymer of polypropylene, the technique involved comprises forming a parison, cooling it below its crystalline freeze point which in the case of polypropylene is a temperature of about 250° F, thereafter reheating said polypropylene parison to orientation temperature, which is just below the crystalline melt point of the polypropylene homopolymer which is a temperature within the range of about 330°–335° F. Subsequently, in accordance with this invention, at least three sections of the parison are irradiated to the appropriate orientation temperatures, prior to passing the parison to a mold cavity for forming into the desired shape.

Figure 2:
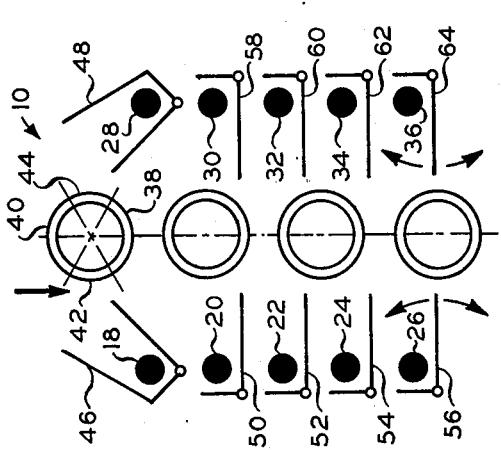

The process of this invention will be described in greater detail with reference to the accompanying drawing which illustrates by means of FIG. 1 a plan view with portions broken away showing a heating oven containing a radiant heating zone immediately preceding the pick point of the oven;

FIG. 2, an enlarged detail view of the radiant heating zone;

FIG. 3 an alternate radiant heating zone; and

Figure 4:
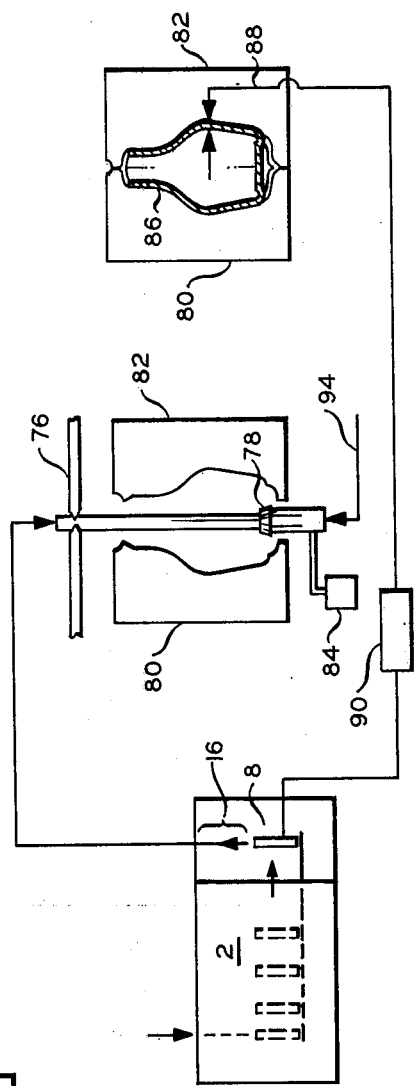

FIG. 4 a schematic representation of a blow molding process wherein the orientation temperatures implanted on the parison in the radiant heating zone are controlled in accordance with the wall thickness of a previously molded article.

Figure 1:
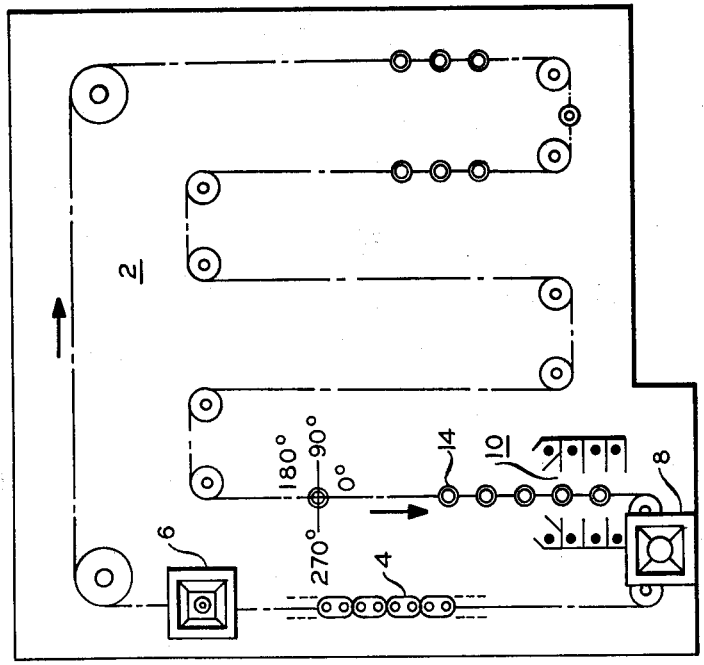

Referring now to the drawing, FIG. 1 shows a plan view of the heating oven 2 containing conveyor chain 4 for transporting parison preforms from a loading station 6 through heating oven 2 to unloading station pick point 8. The parisons travel within the oven along a path centrally disposed away from the oven walls so as to minimize any cooling effect from the oven walls. Fixed 46, 48 and movable 50, 52, 54, 56, 58, 60, 62, 64 (FIG. 2) irradiation channel means selectively direct radiant energy to the selected portions of each parison passing through radiation zone 10 located immediately adjacent to pick point 8. As required, any portion, e.g. lead 38, trail 40, front 44 and back 42, of the parison can be selectively heated to its essential orientation temperature range by individually or collectively moving channel walls 50–56 and 58–64. Additional variance in parison orientation temperature ranges can be obtained by varying the heat output of the individual heating elements, which supply the radiant energy to the parison portions.

FIG. 2 shows an enlarged view of irradiation zone 10 employed during heating of the parisons within heating oven 2 prior to unloading of a parison from pick point 8. Said irradiation zone comprises two rows of radiant heating elements containing cylindrically shaped individual heating elements 18, 20, 22, 24, 26, and 28, 30, 32, 34 and 36, respectively. The heating elements rows are positioned parallel to the general direction of travel of the parison as it travels, essentially free of any angular rotation, through irradiation zone 10. Irradiation elements 18 and 28 are located at the entrance of irradiation zone 10. Fixed channel wall segments 46 and 48 direct the radiant energy emitted by elements 18 and 28 to the leading portion 38 of the parison as it travels through irradiation zone 10. Irradiation elements 20, 22, 24, 26 and 30, 32, 34, 36 by means of pivotally mounted wall segments 50, 52, 54, 56, and 58, 60, 62, 64 are selectively rotated as required to channel radiant energy to the leading 38, trailing 40, back 42, or front 44, portion of the parison as it travels to the parison pick point.

FIG. 3 illustrates another irradiation zone 12, an alternative to irradiation heating zone 10, showing the placement of cylindrically shaped irradiation elements in a circle around the periphery of parison 14. The irradiation elements comprising irradiation zone 12 can be located around, above, or below pick point 8 (for example, at locations 8 and 16 as noted in FIG. 4). As illustrated by the dotted line segments representing alternative locations of individual channel walls 92, the heat input into the parison can be distributed and controlled about any radial segment of the parison.

Referring now to FIG. 4, there is shown a schematic representation of a blow molding operation employing the instant invention comprising an extrusion means 66 for forming a tubular extrudate 68. Tubular extrudate 68 passes through vacuum sizing and quenching chamber 70 and thence to cutting mechanism 72 where it is severed into individual parison preforms 74. Individual parison preforms 74 are heated to orientation temperatures in oven 2 with selected parison portions being heated to a different temperatures in irradiation zones, such as 10 or 12 described hereinbefore. The thus selectively irradiated parisons are passed by transfer mechanism 76, which picks the parison from the oven at point 8 by grasping the top of the parison; and placed into thread-forming jaw means 78 within the mold cavity formed by mold halves 80 and 82. Activating switch 84 actuates pressure source 94 to provide a pressure differential sufficient to expand the parison to the inside wall surface of the mold cavity formed by closure of mold halves 80 and 82. A blow molded article 86, conforming with the inner surface of the mold cavity as shown, results. A wall thickness sensing device 88 measures the thickness of any section of the molded article and by means of a control device 90 regulates appropriate voltage increases or decreases to the individual heating elements of irradiation zone 10 or 12.

Many conventional parts such as thickness gauges, temperature controllers, thermostats, frame members, and irradiation heat source means, have been omitted from the drawings for the sake of simplicity, but their inclusion will be understood by those skilled in the art. The use of any such commonly known devices is within the scope of the invention described herein.

The process of this invention is applicable to the formation of any regularly or irregularly shaped, generally hollow, elongated, orientated blow molded article. It is particularly suited to the formation of irregularly shaped molded articles having a longitudinal axis substantially coaxial with the longitudinal axis of the elongated, hollow parison.

Since parison orientation temperatures differing by temperature gradients as small as 0.0001° F. can affect the wall thickness of the blow molded article, the control of the radiant energy imparted to all radial portions of the parison is essential to effective blow molding of articles of substantially uniform wall thicknesses. This need for careful control of the orientation temperature ranges imparted to a parison is particularly important in blow molding of parisons having a wall thickness in the range of from about 0.1 inch to about 0.5 inch, having diameters in the range of from about 0.5 inch to about 2 inches, and lengths of from about 2 inches to about 12 inches.

The process of this invention is applicable for the production of blow molded articles from any orientatable plastic material. Examplary polymers from which these parisons can be made are orientatable crystalline materials such as polymers of at least one mono-1-olefin having 2–8 carbon atoms per molecule and orientatable amorphous materials such as poly(vinylchloride), polystyrene, butadiene-containing polymers and styrene-acrylonitrile-containing polymers. Preferred polymers are polymers and copolymers of ethylene, propylene, and butene, particularly the polypropylene. These polymers can be formed into hollow parison preforms by simple extrusion or injection molding, or by other conventional techniques, and thereafter cooled to ambient temperatures. In the case of crystal polymers, the orientation temperature to which the area is heated is generally in the range of from 1 to about 50, preferably from about 10° to 30° F, below the crystalline melt point. The amorphous polymers have an orientation temperature generally 40°–225° F, preferably 100°–175° F, below the homogeneous melt point. Thus, the preferred polymer in the practice of this invention is a homopolymer of polypropylene, for instance, would preferably be heated to an average temperature within the range of from 310°–330° F prior to exposure to the selective irradiation zone immediately adjacent to the pick zone contained within said heating zone.

In the practice of this invention, at least three portions of the parison are selectively irradiated to the desired parison portion orientation temperature. The degree of heat imparted to each irradiated parison portion is sufficient to create different temperature gradients within the range of from 0.001° to 10°, preferably from 0.01° to 5°, and more preferably from 0.1° to 2° between three of the parison portions. For example, referring now to FIG. 2, a parison having a temperature of 331° F prior to selective irradiation, following selective irradiation of parison segments 38, 42, and 44 has orientation temperatures of 331.3° F, 331.2° f, 331.2° F, and 330° F corresponding to parison segments 38, 42, 44 and 40, respectively. Accordingly, the selectively irradiated parison has orientation temperature gradients of 0.1° F, 0.2° F, and 0.3° F between selective portions of the parison. All of the temperature figures set out hereinbefore refer to average temperatures.

Set out hereafter is an example in further illustration of the invention which is not to be construed as unduly limitative thereof.

EXAMPLE

Polypropylene homopolymer having a density of 0.91 (ASTM D 1505-63T), and a melt flow of 2 (ASTE (ASTM 1238-62T), Condition L, and a crystalline melting point of about 340° F, was extruded into tubing having an outside diameter of 0.850 inch and a wall thickness of 0.150 inch. The tubing was cooled to room temperature in a vacuum sizing and quenching chamber and cut into 4¾-inch lengths. These 4¾-inch lengths were placed in a heating chamber such as that described in FIG. 1 and heated to an average temperature of about 330° F. Eight 500 watt radiant heaters were disposed as shown in irradiation zone 10 of FIG. 2 to heat selected portions of the parison to orientation temperature ranges which varied from other parison portions by as little as 1/10° F to as much as 5° over a temperature range of from 329½° to 334½° F. A series of runs 1–5 were conducted wherein various portions of a parison was selectively irradiated by means of increasing the heat output of the irradiation elements and by means of channeling the radiant energy by movement of the variable channel wall sections of irradiation zone 10. Run No. 1 represents selective irradiation of the lead section of a parison, only, Run No. 2 represents selective irradiation of the lead, front and back sections of a parison. Run No. 3 is similar to Run No. 2, except the heat input to the front and back sections is greater in Run No. 3 than in Run No. 2. Run No. 4 represents selective irradiation of the lead section of the parison at higher heat inputs then Run No. 1, by directing the radiant energy of all elements to the lead section of the parison as it passes through irradiation zone 10. Run No. 5 represents selective irradiation of the lead section, the front section, the back section and the trail section of the parison as it passes through irradiation zone 10. None of the parisons were rotated as they passed through the irradiation zone 10. The thus-irradiated parisons were then transferred to a mold and expanded by internal fluid pressure to give a bottle having a generally round upper neck area and an oval-to-rectangular body portion corresponding to a 12-ounce blow-molded bottle having a longitudinal dimension of approximately 8 inches, a lateral width varying from 3 to 2 inches, and a normal width varying from 2 to 1½ inches, said lateral and normal width sections being measured on a plane perpendicular to the longitudinal axis of the molded article wherein both the lateral and normal axes lay within the same plane. The resulting molded article was removed from the mold and severed along a plane perpendicular to the longitudinal axis of the bottle at a point approximately 2 inches from the base of the molded article having cross-sectional dimensions substantially equal to the largest lateral and normal cross-sectional dimensions of the molded article. Wall thicknesses of the sectioned article were measured at points radially corresponding to points on the parison surface disposed 0°, 90°, 180° and 270° as shown in FIG. 1 with respect to the direction of passage of the parison through the irradiation zone 10. Set out in Table I hereafter are the dimensions of the wall sections corresponding to the 0°, 90°, 180°, and 270° parison irradiation reference points.

said heating zone at an elevated temperature and maintaining the parison preforms essentially free of any angular rotation, thereby heating said preforms to an average temperature within the orientation range;

d. passing said heated preforms through a secondary radiant heating zone while maintaining the parison preforms essentially free of any angular rotation;

e. directing radiant energy in said secondary radiant heating zone on at least three peripheral radial portions disposed about the circumference of each parison so that each of said peripheral radial portions is selectively heated to a different orientation temperature;

f. passing the thus irradiated parison into a molding zone;

g. creating a pressure differential sufficient to expand the parison into conformity with a molding zone cavity;

h. measuring the thickness of the wall of the expanded parison at least at a point within each of said selectively irradiated peripheral radial portions; and i. controlling the orientation temperature of the equivalent peripheral radial portion of preforms passing through said radiant heating zone in response to said measured thickness to obtain

TABLE I

| | Irradiation Elements Heat Output | | | Molded Article Wall Thickness*** | | | |
|---|---|---|---|---|---|---|---|
| Run No. | Fixed* 18 & 28 | Variable* 20, 22, 24, 26, 30, 32, 34, 36 | Variable Channel Wall Position Angle,** | Lead 0° Axis | Trail 180° Axis | Front 90° Axis | Back 270° Axis |
| 1 | 30 | 0 | 90° | 0.016 | 0.017 | 0.024 | 0.026 |
| 2 | 30 | 55 | 90° | 0.018 | 0.020 | 0.018 | 0.020 |
| 3 | 30 | 70 | 90° | 0.019 | 0.020 | 0.015 | 0.016 |
| 4 | 30 | 55 | 45° | 0.003 | 0.036 | 0.018 | 0.020 |
| 5 | 30 | 55 | 135° | 0.034 | 0.003 | 0.018 | 0.020 |

*Autotransformer dial settings
**90° — perpendicular to direction of the parison travel
  45° — disposed 45° from a line perpendicular to the direction of the parison travel and toward the entrance of irradiation zone 10
  135° — disposed 45° from a line perpendicular to the direction of the parison travel and toward the exit of irradiation zone 10
***All the molded article cross-sectional walls are measured in inches.

The above example data illustrates that selective irradiation of at least three portions, e.g. lead, front and back portions of a parison, at regulated heat input is an appropriate means of adjusting the orientation temperature ranges of a parison in order to obtain blow molded parisons having substantially uniform wall thickness.

Reasonable variations and modifications of the teachings of this invention will be readily apparent to those skilled in the art.

I claim:

1. A continuous process for producing a parison and blow molding said parison into conformity with a molding zone cavity to produce a molded article having substantially uniform wall thickness, said process comprising:

a. producing tubular extrudate and cooling said extrudate below its orientation temperature;

b. separating said tubular extrudate into parison preforms;

c. passing said preforms through a heating zone containing a primary heating source while maintaining molded articles having walls of substantially uniform thickness.

2. A process in accordance with claim 1, step (e), wherein at least three of said radial portions traverse the length of the selectively irradiated parison.

3. A process according to claim 2, step (e), wherein said radial portions are selected from the lead, trail, front and back portions of the selectively irradiated parison.

4. A process in accordance with claim 3 wherein the orientation temperature differences are within the range of from 0.001 to 10° F.

5. A process in accordance with claim 4 wherein said parison has a wall thickness in the range of from about 0.1 to about 0.5 inch, a diameter in the range of from about 0.5 to about 2 inches, and a length in the range of from about 2 to about 12 inches.

6. A process in accordance with claim 5 wherein the parison is derived from an orientatable plastic material.

7. A process in accordance with claim 6 wherein said material is polypropylene.

* * * * *